UNITED STATES PATENT OFFICE.

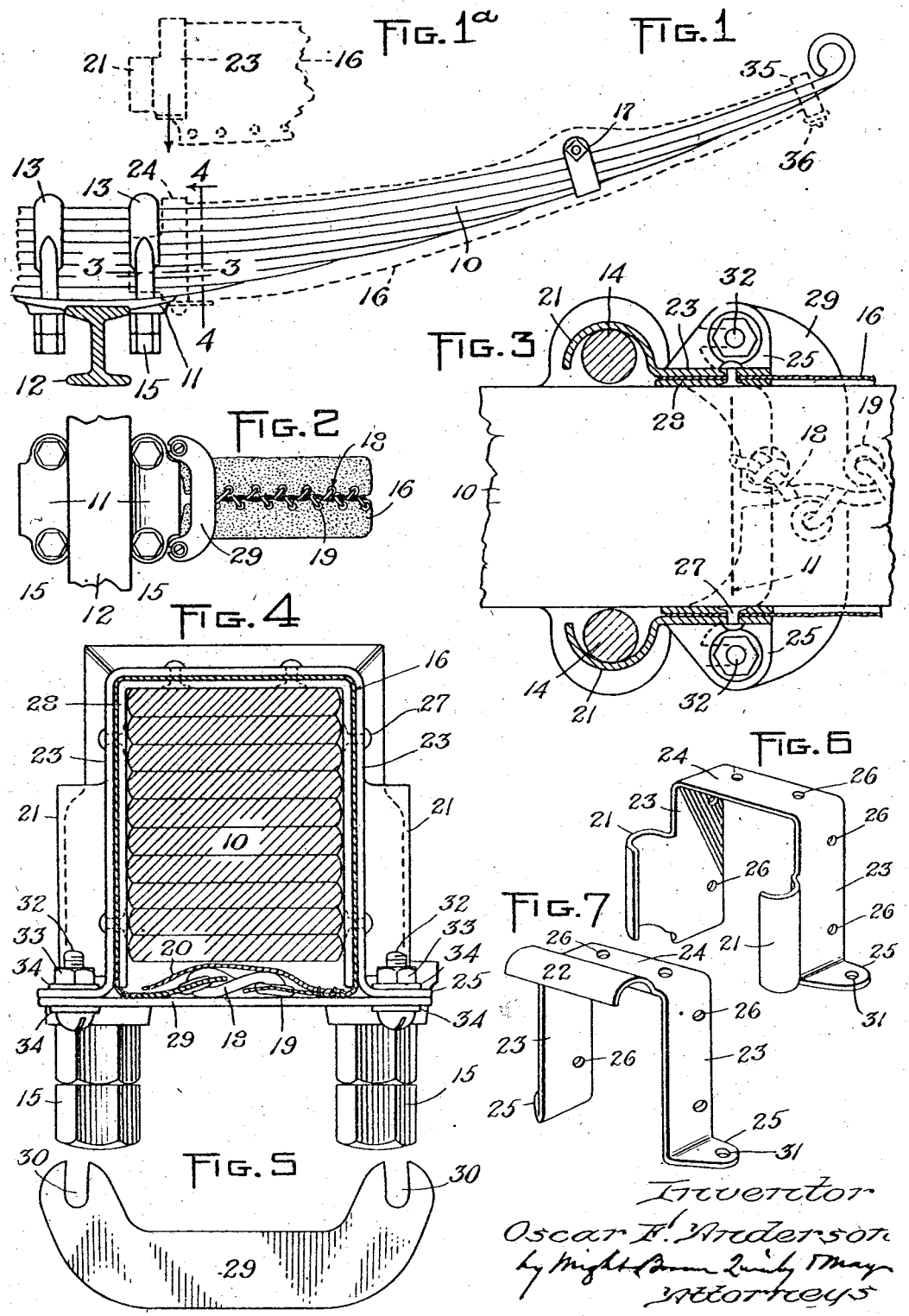

OSCAR F. ANDERSON, OF BROOKLINE, MASSACHUSETTS.

BOOT OR CASING FOR LEAF-SPRINGS.

1,195,896.  Specification of Letters Patent.  Patented Aug. 22, 1916.

Application filed April 21, 1916. Serial No. 92,755.

*To all whom it may concern:*

Be it known that I, OSCAR F. ANDERSON, a citizen of the United States, residing at Brookline, in the county of Norfolk and State of Massachusetts, have invented new and useful Improvements in Boots or Casings for Leaf-Springs, of which the following is a specification.

The object of the present invention is to provide an improved boot or casing for a laminated leaf spring.

The leaf springs that are used to support the bodies of motor vehicles, especially passenger vehicles, require lubrication between the laminæ, and the operation of injecting a lubricant is difficult and requires much time. For this reason it has been proposed to provide boots or casings made of thin flexible sheet material, such as leather or canvas, to inclose the springs and to contain a lubricating substance such as grease or oil. The operation of attaching such boots or casings as have been used hitherto would be comparatively difficult because of the inaccessibility of the springs, especially the rear springs of a passenger vehicle, because such springs are almost wholly concealed by the fenders and other elements of the vehicles. A device for the purpose stated must be anchored at each end in order to keep it extended, for otherwise the end portion inclosing the larger portion of the spring would creep toward the smaller end. Various devices have been proposed for anchoring the ends of such casings, but such means have involved considerable difficulty in order to attach them, the difficulty in some cases requiring detaching the U-bolts or other spring-anchoring means, and in other cases requiring lacing or otherwise connecting the adjacent ends of two casings one to another.

My present invention provides improved means for anchoring the larger end of a boot or casing, in consequence of which the latter will be securely held in the desired position, and whereby the operation of attaching it may be more quickly and more easily effected than has been possible with devices as hitherto constructed. The middle portion of a semi-elliptic leaf spring, and the larger end of a quarter-elliptic leaf spring, are anchored to a bolster or to the vehicle body, as the case may be, usually by U-bolts. In order to facilitate the attaching of my improved device, I have provided the boot or casing with a metal clip having one or more clencher portions arranged to slip over and coact with one of such U-bolts, and the operation of anchoring such clip in clenched relation to such U-bolt does not require detaching the U-bolt or loosening the nuts by which it is secured to its bolster or to the vehicle body.

My improved clip is capable of being applied to an "underslung" spring and to a spring that rests upon a bolster, and is capable of being applied to the upper section of an elliptic or three-quarter elliptic spring.

Of the accompanying drawings: Figure 1 represents a side elevation of a lower quarter-section of a laminated leaf spring mounted upon a bolster, and includes dotted lines representing the outline of a boot or casing provided with an anchoring clip embodying the present invention and occupying coöperative relation to one of the U-bolts by which the spring is anchored to the bolster. Fig. 1ª represents a side elevation of one end portion of such boot or casing provided with the anchoring clip, and arranged, in its relation to Fig. 1, to indicate how, by placing it above the spring, it can be applied by downward vertical movement. Fig. 2 represents a bottom plan view including the spring bolster shown in Fig. 1, and a portion of the boot or casing applied to and inclosing the spring. Fig. 3 represents a section through the structure intersected by line 3—3 of Fig. 1, including a portion of the boot or casing and its anchoring clip. Fig. 4 represents a section through the structure intersected by line 4—4 of Fig. 1, including the boot or casing and its anchoring clip. Fig. 5 represents a bottom plan view of a metallic connecting link by which the anchoring clip is locked in operative position. Fig. 6 represents a perspective view of the anchoring clip detached from all other elements. Fig. 7 represents a perspective view of an anchoring clip embodying the invention in another form.

The same reference characters indicate the same parts wherever they occur.

A quarter section of a laminated leaf spring is indicated at 10, and it is shown mounted upon a bolster 11 formed upon an axle 12, such as a front axle. The spring is anchored to the bolster by two U-bolts 13, 13, the shank portions 14 of which lie against opposite sides of the spring and extend through the bolster. These shank portions are provided with screw-threads and are drawn down by nuts 15 to clamp the spring. This form of spring and anchoring means is typical of the structures now in general use.

The boot or casing comprises a substantially tubular body member 10 composed of flexible sheet material, such as leather or canvas. It is preferably shaped to conform to the curvature and taper of the spring section to which it is to be applied, although it would preferably be enough larger than the spring, in cross section, to leave room for a lubricant, such as grease, and to inclose the device 17 (Fig. 1) by which some of the leaves of the spring are bound together. Although I have described the boot or casing as being tubular, it is tubular only when closed, and is capable of being opened throughout its length for attaching it and detaching it. The open side is preferably arranged under the spring, and its two marginal portions may be connected one with the other by any suitable means. I have shown a lacing cord 18 for this purpose, the two marginal portions of the casing being provided with eyelets 19 through which the cord 18 may be laced. One marginal portion of the casing is provided with a flap 20 (see Fig. 4) arranged to lie across the lacing and cover the gap between the marginal portions sufficiently to exclude dirt and to prevent the escape of grease.

The end portion of the casing, that is to inclose the larger portion of the spring 10, is provided with an anchoring clip which, in the form shown by Figs. 1 to 6, has two clencher portions 21, 21 arranged in opposite relation to each other. In the form shown by Fig. 7 the anchoring clip has but one clencher portion, that indicated at 22. In either case the clip may be made of a single piece of flat sheet metal. The two forms shown are alike in all respects, excepting that the first form has two clencher portions adjoining the flat side portions 23, 23; while the form shown by Fig. 7 has one clencher portion adjoining the transverse flat portion 24. In end elevation the clip is substantially U-shaped, and its extremities are bent away from each other to provide ears 25, 25. The portions 23, 23, and 24 are provided with holes 26 for the reception of fasteners such as rivets 27, such fasteners being used to secure the clip to the tubular body member 10. A stay 28 consisting of a strip of relatively tough material and shaped to conform to the anchoring clip, is provided to reinforce the connection between the clip and the tubular body member 10, said stay being arranged to take the rivets 27 and serving conjointly with the clip to clamp the member 10, provided the rivets are set in tightly enough to cause a clamping action.

Assuming that it is desired to apply the boot or casing to the spring assemblage shown by Fig. 1, the lacing cord 18 would be removed from the eyelets, and the tubular body member 10 would be opened throughout its length. It could then be applied to the spring by moving it downwardly from the position indicated by Fig. 1ª, but before applying it it would be desirable to wipe all the dirt from the spring and spread a quantity of grease or other lubricant upon the top surface of the upper lamina of the spring. As the boot or casing is placed upon the spring the clencher portions 21 (referring to the form shown by Figs. 1 to 6) would move into clenched relation with the shank portions 14 of the U-bolt and would slide along said shank portions. The lacing cord 18 would then be threaded through the eyelets 19 and drawn therethrough to draw the marginal portions of the member 10 into substantially contiguous relation, as shown by Figs. 2 and 4. The connecting link 29 shown separately by Fig. 5 is provided to tie the extremities of the anchoring clip to each other and to prevent the clip from being accidentally detached. This connecting link may be made of a piece of sheet metal. It is provided with slots 30, 30 arranged to register with holes 31, 31 formed in the ears 25, 25 of the anchoring clip. Screw-bolts 32 are arranged in the holes 31 respectively, and each is provided with a nut 33 and with washers 34, 34. The slots 30 in the connecting link permit attaching and detaching the latter without removing the bolts 32 from the ears 25, and in order to attach the link it is sufficient to merely unscrew the nuts a short distance. The offset formation of the link 29, whereby the intermediate portion is offset from alinement with the end portions, is intended to provide clearance for the extremity of the bolster 11, as indicated in Fig. 2. When the link 29 is applied as shown, it extends under the spring and so prevents the clip from sliding upwardly on the shanks of the U-bolt. The lower side of the casing member 10, including the lacing cord 18, lies between the link 29 and the under surface of the spring, and consequently serves to take up whatever space there may be between the bottom of the spring and the link, thus preventing rattling of the metal parts one against another.

Any suitable means may be provided for binding the outer end of the casing member 10, and I have not attempted to show any means for this purpose, excepting a conventional representation in Fig. 1 of a strap 35 that may be fastened to the casing member 10 by stitches or otherwise and may be provided with a buckle in any form desired, as at 36. When the strap is drawn tightly around the spring and securely fastened, it will not creep toward the larger end of the spring, because such creeping would be prevented by the tapering formation of the spring.

Referring to Figs. 4 and 6, the side portions 23, 23 of the anchoring clip are capable of being bent away from each other if such bending is found to be necessary to permit attachment to spring-anchoring means that will not permit the clip to be slipped on as hereinbefore explained. Some springs, in some cases underslung springs, are not anchored by U-bolts such as I have shown and described, but are anchored by some equivalent means differing in form but not in substance. Two separate headed bolts and a transverse plate are sometimes used in place of the more common U-bolt, and in such cases the transverse plate would obstruct the passage of the clencher portions 21 in the manner hereinbefore explained. For this reason it might be necessary to bend the portions 23 away from each other a distance of from three-quarters of an inch to an inch at the free ends of such portions, and to slip the clip upon the spring, at one side of the anchoring bolts, and then to move the clip toward the anchoring bolts in a direction at right angles to the axes of said bolts. Such movement would carry the clencher portions 21, 21 outside the anchoring bolts, and the clip could then be brought to clenched relation with such bolts by bending the portions 23, 23 toward each other. The portions 23, 23 would thereafter be secured in operative position by the connecting link 29.

Although I prefer the form of clip shown by Fig. 6, the invention is not dependent upon the number and arrangement of the clencher portions shown by this figure. An anchoring clip in the form shown by Fig. 7, and having but one clencher portion adjoining the transverse portion 24, could be applied as readily as the other form and would anchor the boot or casing to the U-bolt or other means provided for anchoring the spring to the vehicle. The clencher portion 22 would not, of course, coact with the shank portions 14, 14 of the U-bolt, but would coact with the transverse portion that connects such shank portions; but it would nevertheless afford the desired anchorage, provided the side portions 23 were of substantially the same depth as the contiguous portion of the spring. However, as there is considerable difference in springs in this respect, the form shown by Fig. 7 might not be suitable in as many instances as the form shown by Fig. 6.

I claim:

1. A boot or casing for a laminated leaf-spring, comprising a substantially tubular body member composed of flexible sheet material, and a relatively stiff anchoring clip arranged at and fastened to one end of said body member, said clip having a clencher-portion arranged to clench a portion of a spring-anchoring member, substantially as described.

2. A boot or casing for a laminated leaf-spring, comprising a substantially tubular body member composed of flexible sheet material, and a relatively stiff anchoring clip arranged at and fastened to one end of said body member, said clip having two coöperative clencher-portions arranged in opposite relation to each other in position to clench two portions of the spring-anchoring means at opposite sides of the spring, substantially as described.

3. A clip for anchoring a boot or casing upon a laminated leaf-spring, comprising a substantially U-shaped member adapted to embrace three sides of such spring near the anchoring means of the latter, and having a clencher portion arranged to embrace a portion of such anchoring means.

4. A clip for anchoring a boot or casing upon a laminated leaf-spring, comprising a substantially U-shaped member adapted to embrace three sides of such spring near the anchoring means of the latter, the two branches of said clip having clencher portions arranged to embrace such anchoring means at opposite sides of the spring.

5. A device for anchoring a boot or casing upon a laminated leaf spring, comprising a substantially U-shaped member adapted to embrace three sides of such spring near the anchoring means of the latter, and connecting means adapted to be attached to the end portions of said clip to tie said end portions to each other, said clip having a clencher portion arranged to embrace a portion of such anchoring means, and said connecting means being adapted to keep said clip in clenching position relatively to such anchoring means.

In testimony whereof I have affixed my signature.

OSCAR F. ANDERSON.